United States Patent [19]

Fujiwara

[11] Patent Number: 5,740,446
[45] Date of Patent: Apr. 14, 1998

[54] COMPILING DEVICE AND COMPILING METHOD

[75] Inventor: Yuji Fujiwara, Tokyo, Japan

[73] Assignee: NEC Corporation, Tokyo, Japan

[21] Appl. No.: 521,449

[22] Filed: Aug. 30, 1995

[30] Foreign Application Priority Data

Aug. 30, 1994 [JP] Japan .................................. 6-205781

[51] Int. Cl.[6] ........................................................ G06F 9/44
[52] U.S. Cl. ............................................................. 395/709
[58] Field of Search ............................................... 395/709

[56] References Cited

U.S. PATENT DOCUMENTS 5,481,713  1/1996  Wetmore et al. ...................... 395/705
5,546,586  8/1996  Wetmore et al. ...................... 395/705

Primary Examiner—Kevin A. Kriess
Assistant Examiner—John Q. Chavis
Attorney, Agent, or Firm—Foley & Lardner

[57] ABSTRACT

A compiling method includes a step of performing lexical analysis by entering a source program, a step of performing analysis of the initial value of variables described in the source program, and a step of generating a code according to the result of the analysis of the initial value and outputting an object program. The step of performing analysis of the initial value includes a step for dividing variables described in the source program into those without an initial value and those with an initial value, a step of judging whether prescribed members of elements configuring the array of structure have one and the same initial value, and a step of arranging the divided variables into different segments, and arranging the variables of the array of structure where the prescribed members have the same initial value into the segments with the same initial values omitted.

15 Claims, 9 Drawing Sheets

COMPILING DEVICE AND COMPILING METHOD

BACKGROUND OF THE INVENTION

1. Field of the Invention

This invention relates to a compiling device which receives a source program, translates it into an object program and outputs, and to a compiling method, and particularly to a compiling device having a ROMing function and its compiling method.

2. Description of the Related Art

Various compiling technologies are used to translate a program describing language, e.g., converting a source program into an object program. The compiling technology is extensively used in developing software, and also popularized in developing software for microprocessors owing to the emergence of a C compiler. Also, it was recently started to be used for a built-in control system using a one-chip microcomputer.

In most cases, the built-in control system using a one-chip microcomputer does not have any auxiliary storage such as a hard disk drive or a floppy disk drive. Therefore, it has a ROM in which an operation program is stored, and is used with the program already present when its power switch is turned on. This system processes a variable having an initial value in a way different from an ordinary way. For instance, when "int n=10;" is declared, a value of 10 is given to the n before the execution of this program, and this value can be changed. In this case, there is not any problem when a program or data is stored in the auxiliary storage, and it is loaded into RAM before the program is executed. Specifically, at the time of loading into the RAM, the value of 10 is written into a variable n, and the variable n can be changed because the loading is made into the RAM.

In the above built-in control system, the value of a reloadable variable to be arranged in the RAM is indefinite when the power is turned on. On the other hand, the ROM whose reloadable contents are definite cannot change the value of a variable. Therefore, the initial value of a variable having an initial value (hereinafter referred to as the variable with initial value) is arranged in the ROM, and copied into the RAM before use. Thus, one variable uses each area of the RAM and the ROM. And, the program itself is required to operate assuming that the variable area is present in the RAM from the beginning.

The variable with initial value is automatically arranged in the ROM by the ROMing function of a compiler. The above built-in control system generally uses an inexpensive CPU and a necessary and minimum memory. Consequently, the compiler is required to output a code which is small and can be executed at a high speed in order to reduce the used area of the system's memory.

FIG. 8 is a flowchart showing one example of processing procedures of an initial value analyzing means contained in a conventional compiling method. In this case, an object program is generated with the initial value of a variable arranged in RAM as a code arranged in ROM. FIG. 9 shows the configuration of one example of the initial value in the segment data form arranged in the ROM. In the drawing, a first segment 901 is a data division segment generated when a variable described in a source program has an initial value, and a second segment 902 is a data division segment generated when the variable does not have an initial value. FIG. 10 is a flowchart showing one example of procedure to expand the initial value contained in a startup program for expanding the initial value arranged in the ROM at the address of the variable having its area reserved in the RAM.

Not shown but the compiling device in the above conventional example has a controlling part which contains a compiler part and a linker part and generates a program, and an auxiliary storage which stores a source program and the generated program. The compiler part receives a source program, performs lexical analysis and syntax analysis, analyzes the initial value, processes to generate a code, and generates and outputs an object program. The linker part receives the generated object program and a previously provided startup program to link them, and generates and outputs an executable program.

In FIG. 8, the compiler part judges whether or not the variable described in the received source program has an initial value (Step 801). When it is judged that the variable has an initial value, the variable is arranged in the second segment for securing an area for the variable in the RAM and for arranging the initial value in the ROM (Step 802). On the other hand, when it is judged that the variable does not have an initial value, the variable is arranged in the first segment which merely secures an area for the variable in the RAM (Step 803).

FIG. 9 shows the configuration of the initial value in the segment data form arranged in a conventional ROM for an executable program. In FIG. 9, the initial value is arranged in the ROM in correspondence with the area for the variable secured in the RAM. This is also applied to the array of structure, and as shown in the second segment 902 with the initial values in FIG. 9, the initial values 903 of the array of structure of respective members are arranged in correspondence with the addresses of respective arrays.

Referring to the flowchart of FIG. 10, description will be made of the procedure of analyzing the initial values contained in the startup program stored in the auxiliary storage.

First, a value "0" is expanded into the area of the variable having no initial value (hereinafter referred to as the variable without initial value) with its area secured in the RAM and arranged in the first segment (see Step 803 in FIG. 8) (Step 1001). Then, the initial value of the variable with initial value arranged in the second segment (see Step 802 in FIG. 8) is read from the ROM, and written into the area of the variable with initial value in the RAM. Thus, the initial value is arranged in the RAM. The expansion of the variable without initial value in Step 1001 indicates that there is no initial value in the source program but the value "0" is set when executed. The arrangement of the initial value "0" to the ROM can be avoided if the initial value is not designated on the source program with respect to the variable of the initial value "0".

FIG. 11 is a diagram showing a specific example of the arrangement of the initial values set in the RAM by executing the program from the arrangement of the initial values in the ROM generated by the ROMing function of a conventional compiler.

In FIG. 11, a variable "aa" A11 is defined as the variable without initial value, and a variable "bb" A12 and a variable "cc" A14 are defined as the variable with initial value within a source program A10. The variable "cc" A14 is an example of the array of structure of c-tb1 type declared by a structure declare statement struct A13. The designated source program A10 is entered into a compiler part 111, and an object program A20 is outputted from the compiler part 111. The object program A20 as well as a startup program A30 are entered into a linker part 112, and an executable program 40 is outputted from the linker part 112.

The contents of processing of the variable by an initial value analyzing means in the compiler part 111 will be described with reference to the flowchart of FIG. 8.

In the flowchart of the initial value analyzing means in FIG. 8, the judgment of the presence or not of the initial value of the variable in Step 801 concludes that the variable "aa" A11 has no initial value. In Step 803, this variable "aa" A11 is arranged in the first segment for no initial value only for securing an area in the RAM. Then, Step 801 judges that the variable "bb" A12 and the variable "cc" A14 have an initial value. And, in Step 802, the variable "bb" A12 and the variable "cc" A14 are arranged in the second segment for the presence of initial value for securing an area of the RAM and for arranging initial values in the ROM.

With respect to the object program A20 shown in FIG. 11, the initial value of the variable "bb" A12 and the initial value of the variable "cc" A14 are outputted as data arranged in ROM 115, and after being outputted by the linker part 112, the executable program A40 is written in the ROM 115 by a ROM writing device 113. The initial value of the variable "bb" A12 is written in an area 1151 of the ROM 115, and the initial value of the variable "cc" A14 in an area 1152 of the ROM 115. The initial values written in the ROM 115 are expanded into RAM 116 by the startup program A30 upon starting of execution by a program executing part 114.

The contents of steps for processing the initial values to be expanded will be described with reference to the flowchart of FIG. 10.

In the flowchart of the initial value expanding procedure by the startup program in FIG. 10, Step 1001 expands 0 into a RAM area 1161 for the variable "aa" A11. Then, Step 1002 expands the initial value, which is arranged in the ROM area 1151, into a RAM area 1162 for the variable "bb" A12. And, the initial value arranged in the ROM area 1152 is expanded into a RAM area 1163 for the variable "cc" A14. Thus, the expansion of the initial values is completed.

As described above, conventionally, the initial value "0" of the variable "aa" A11 which does not have an initial value is not arranged in the ROM, and expanded into the RAM area 1161 by the startup program A30 upon starting execution by the program executing part 114. Thus, the used area of the ROM 115 can be reduced.

In the same way, the omission of describing the initial value "0" of the variable "bb" A12 which has an initial value does not use the ROM area 1151 and the value "0" is expanded into the RAM area 1162 by the startup program A30 upon starting execution by the program executing part 114.

But, in the case of the array of structure such as the variable "cc" A14, the designation of a member's initial value cannot be omitted. Thus, all members with the initial value "0" are arranged in the ROM 115 as seen in the ROM area 1152, and many data having the same value are present in the ROM 115. In FIG. 11, the ROM areas used for the arrangement of the initial value of the variable "cc" A14 are equal to 200 areas which result from 2 members by 100 elements. Of the 200 areas, 100 areas have the same data.

Thus, the ROMing function of the conventional compiling method arranges a large number of same data into the ROM when the members' initial values are same for all elements with respect to the initial values of the array of structure. Therefore, the conventional compiling method has disadvantages that data quantity is increased, and the used area of the memory cannot be reduced sufficiently.

In connection with the above ROMing function of the conventional compiling method, relevant technologies are seen in "C Programming Technique for Built-in Control System" (PP. 80–125) written in "Special article: Development of Built-in Program by C and OOP" of "Interface", June 1993, CQ Publication; and "Chapter 5 Consideration of the Ability of C" (PP. 38–44) and "Chapter 10 Method for ROMing MS-C" (PP. 122–138) written in "Special article: Programming for Built-in Equipment by C" of "Transistor Technology Special No. 24", CQ Publication.

SUMMARY OF THE INVENTION

This invention aims to remedy the above problems, prevent lots of many same data from being arranged in ROM, and reduce ROM areas in which data is arranged, thereby providing a compiling method which can reduces the used areas of a memory.

According to one aspect of the invention, a compiling method comprising:

a step of generating an object program by entering a source program; and a step of generating an executable program by entering the generated object program and a startup program for controlling the initial operation of the program at the start of execution;

said step for generating the object program including:

a step of performing lexical analysis with respect to the entered source program, a step of performing syntax analysis of the program undergone said lexical analysis, a step of performing analysis of the initial value of variables described in the program undergone the syntax analysis, and a step of generating a code according to the result of the analysis of the initial value and outputting the object program; and said step of analyzing the initial value including:

a step of dividing the variables into those without an initial value and those with an initial value according to a define statement of variables described in said source program, and further dividing the variables with an initial value into those of an array of structure and other variables, a step of judging with respect to the variables recognized as the array of structure among the divided variables whether prescribed members of elements configuring said array of structure have one and the same initial value, and a step of arranging said divided variables into different segments, and arranging the variables of the array of structure where said prescribed members have the same initial value into said segments with said same initial values omitted.

In the preferred construction, the step of arranging the variables into the segments, with respect to the variables of the array of structure where said prescribed members have the same initial value, arranges at least a member number of said array of structure, an arranged element number of said array of structure, information specifying members having the same initial value, the initial value of the members having the same initial value, and different initial values of the members into the segments.

Also, the step of judging whether the prescribed members of said array of structure have one and the same initial value subtracts the number of the members having different initial values from the number of all members with respect to each element of said array of structure, and judges that said array of structure has the members having the same initial value if the obtained value is not zero.

In the above-mentioned construction, the step of judging whether all members of said array of structure have one and the same initial value includes:

- a step of storing the initial value of each member at the first address of said array of structure,
- a step of storing the number of members of said array of structure,
- a step of comparing the initial value of each member at the second address and later of said array of structure with the initial value N of each member of said first address, and if they do not agree, subtracting the number of the members which have the different initial values from the number of the stored members and storing as a new member number, and
- a step of judging that said array of structure has members having the same initial value when the stored new member number is not zero, and judging that said array of structure does not have members having the same initial value when said member number is zero.

In the preferred construction, the step of judging whether the prescribed members of said array of structure have one and the same initial value compares the number of members having different initial values for each element of said array of structure with said number of all members, and when said two member numbers are different, judges that said array of structure has members having the same initial value.

According to another aspect of the invention, a compiling device comprising:

- a compiler means which receives a source program and generates an object program, and
- a linker means which receives the generated object program and a startup program for controlling the initial operation at the start of executing the program and outputs an executable program, said compiler means includes:

- a lexical analyzing means for performing lexical analysis with respect to the entered source program,
- a syntax analyzing means for performing syntax analysis of the program undergone said lexical analysis,
- an initial value analyzing means for analyzing the initial values of variables described in the program undergone the syntax analysis, and
- a code generating means for generating a code according to the result of the analysis of the initial value and outputting the object program; and said initial value analyzing means divides the variables into those without an initial value and those with an initial value according to a define statement of variables described in said source program, and further divides the variables with an initial value into those of an array of structure and other variables, judges with respect to the variables recognized as the array of structure among the divided variables whether prescribed members of elements configuring said array of structure have one and the same initial value, and arranges said divided variables into different segments, and arranges the variables of the array of structure where said prescribed members have the same initial value into said segments with said same initial values omitted.

In the preferred construction, the initial value analyzing means, with respect to the variables of the array of structure where said prescribed members have the same initial value, arranges at least a member number of said array of structure, an arranged element number of said array of structure, information specifying members having the same initial value, the initial value of the members having the same initial value, and different initial values of the members into the segments.

In the above-mentioned construction, the startup program to be linked with the object program by said linker means, at the start of executing the program, refers to information specifying a member having said same initial value and the initial value of the member having the same initial value, with respect to the array of structure arranged in the segment with the same initial value omitted, to control an initial value expanding process for supplementing said omitted initial value.

In the preferred construction, the initial value analyzing means subtracts the number of the members having different initial values from the number of all members with respect to each element of said array of structure, and judges that said array of structure has the members having the same initial value if the obtained value is not zero, and with respect to the variables of the array of structure where said prescribed members have the same initial value, arranges at least a member number of said array of structure, an arranged element number of said array of structure, information specifying members having the same initial value, the initial value of the members having the same initial value, and different initial values of the members into the segments.

In the preferred construction, the initial value analyzing means compares the number of members having different initial values for each element of said array of structure with said number of all members, and when said two member numbers are different, judges that said array of structure has members having the same initial value, and with respect to the variables of the array of structure where said prescribed members have the same initial value, arranges at least a member number of said array of structure, an arranged element number of said array of structure, information specifying members having the same initial value, the initial value of the members having the same initial value, and different initial values of the members into the segments.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DETAILED DESCRIPTION OF THE INVENTION

Figure 1:
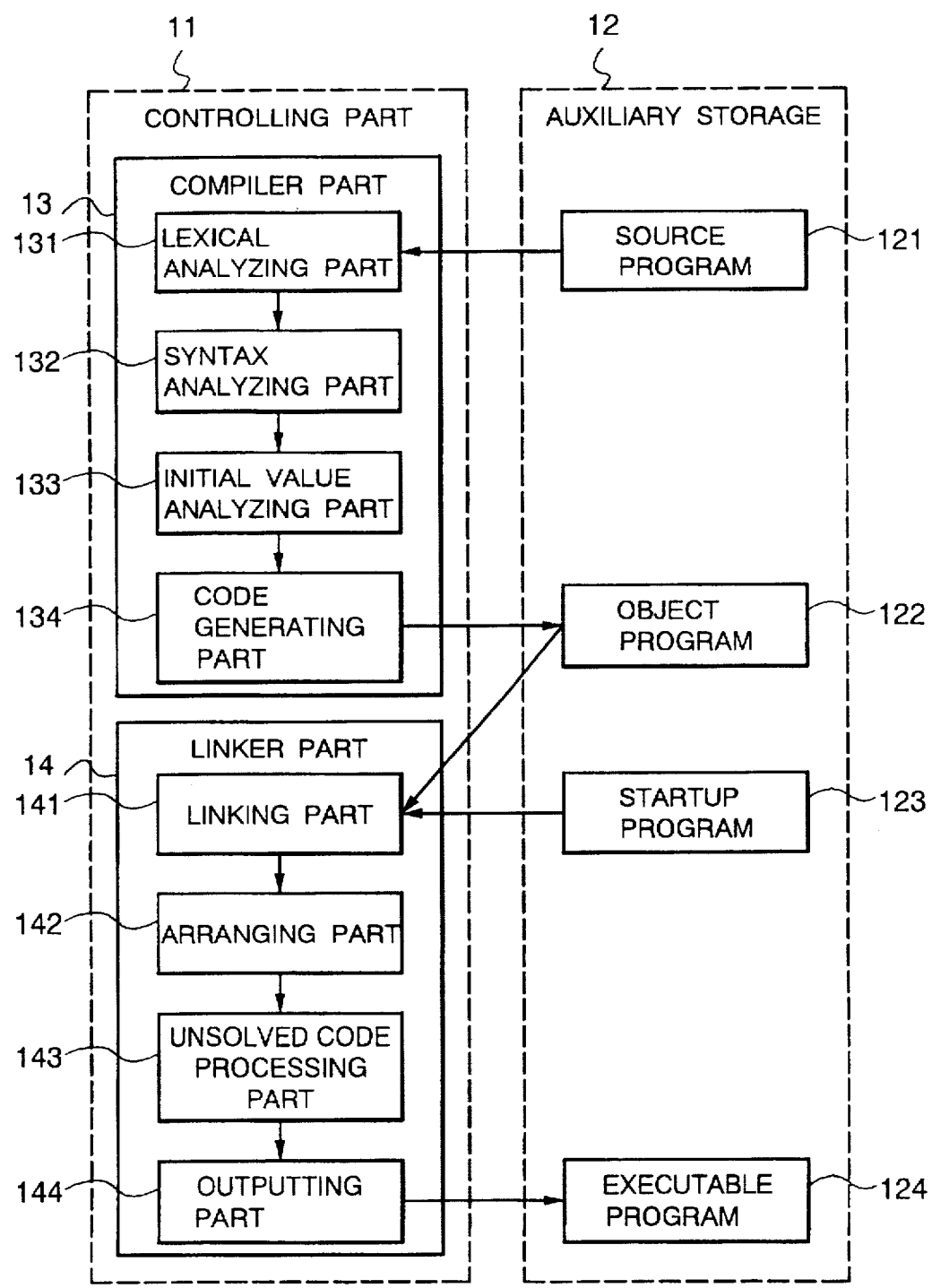
FIG. 1 is a block diagram showing the configuration of the compiling device according to one embodiment of the invention.

Preferred embodiments of the invention will be described in detail with reference to the attached drawings. FIG. 1 is a block diagram showing the system configuration of the compiling device according to one embodiment of the invention.

As shown in the drawing, the compiling device of this embodiment has a controlling part 11 for performing prescribed processing and an auxiliary storage 12 for storing a source program and a generated program.

The controlling part 11 is served by the CPU of a personal computer or workstation. As shown, the controlling part 11 has a compiler part 13 which receives a source program 121 and generates an object program. 122, and a linker part 14 which receives the generated object program 122 and a previously provided startup program 123 and outputs an executable program 124.

The compiler part 13 has a lexical analyzing part 131 and a syntax analyzing part 132 which perform lexical analysis and syntax analysis respectively with respect to the entered source program 121, an initial value analyzing part 133 for performing the initial value analysis of the source program 121 undergone the syntax analysis, and a code generating part 134 for generating a code according to the result of the initial value analysis.

The lexical analyzing part 131 performs the lexical analysis by decomposing the source program read from the auxiliary storage 12 into lexical units. The syntax analyzing part 132 configures a syntax according to the result of the lexical analysis by the lexical analyzing part 131 and recognizes the configured syntax.

The initial value analyzing part 133 extracts a define statement of the variable according to the result of the syntax analysis made in the syntax analyzing part 132. And, a variable without initial value, a variable with initial value, and a variable of the array of structure that a member has a prescribed initial value are recognized and arranged in a first segment having an attribute of the variable without initial value, a second segment having an attribute of the variable with initial value, and a third segment having an attribute of the variable of the array of structure having the member's prescribed initial value.

The code generating part 134 codes the segment of the above variable arranged by the initial value analyzing part 133, generates the object program 122 and outputs it. The outputted object program 122 is entered and stored in the auxiliary storage 12.

The linker part 14 has a linking part 141 which receives and links the object program 122 and the startup program, an arranging part 142 for arranging a segment according to the linked programs, an unsolved code processing part 143 for processing an unsolved code to generate an executable program, and an outputting part 144 for outputting the generated executable program.

The linking part 141 receives a plurality of object programs 122 entered from the auxiliary storage 12 and the startup program 123 for executing the initial value expanding process, and links these two programs. The arranging part 142 arranges the segments contained in the programs linked by the linking part 141. The unsolved code processing part 143 solves all unsolved codes such as a jump address, and generates the executable program 124 corresponding to the source program 121. The outputting part 144 outputs the generated executable program 124 and stores in the auxiliary storage 12.

Operation of the initial value analyzing part 133 of the compiler part 13 in the compiling device shown in FIG. 1 will be described.

Figure 2:
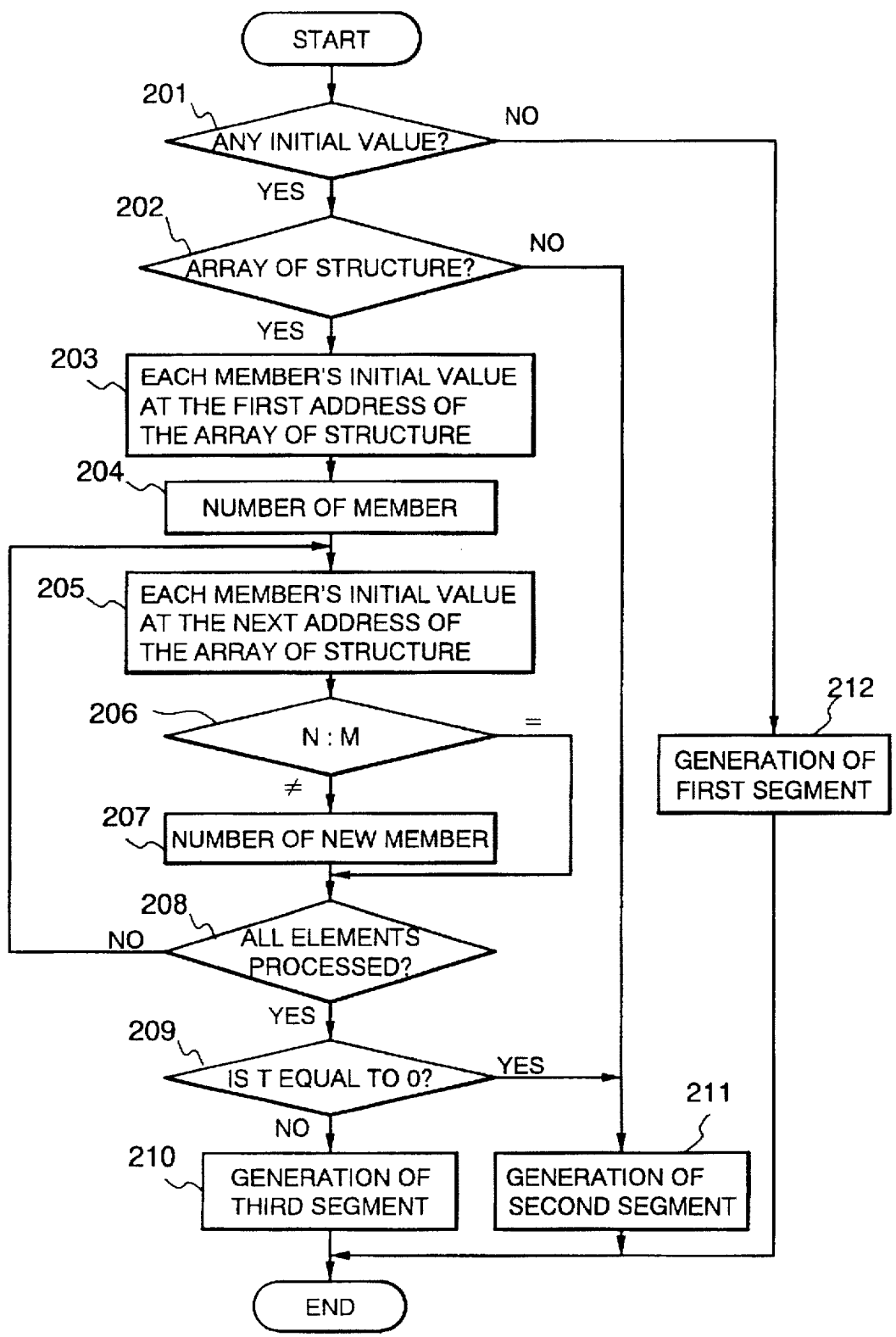
FIG. 2 is a flowchart showing one embodiment of the initial value analysis by the compiling method of the invention.

FIG. 2 is a flowchart showing one embodiment of the procedure for initial value analysis by the initial value analyzing part 133.

First, it is judged whether the define statement of the variable described in the source program 121 has an initial value (Step 201). When it is judged that it has an initial value, it is judged whether the defined variable is an array of structure (Step 202). When it is judged that the defined variable is an array of structure, initial value N of each member at the first address of the array of structure and member number T of the structure are stored (Step 203, Step 204).

Then, initial value M of each member at the next address is stored (Step 202), and the initial value M of each member stored is compared with the initial value N of each member stored by Step 203 to judge whether they agree or not (Step 206). When all initial values agree, it is judged whether all elements have been processed (Step 208). When there is any initial value of mismatched members, the mismatched members are determined as the members without prescribed initial value, and the number of members not having a prescribed value is subtracted from the member number T attained in Step 204 and newly stored as the member number T (Step 207), then it is judged whether all elements have been processed (Step 208).

When it is judged that processing has not been completed to the last element of the array of structure, the process returns to Step 205 (Step 208). When processing is completed to the last element of the array of structure, it is judged whether the value of the member number T attained in Step 207 is "0" to determine the presence of a member having the prescribed initial value (Step 209). And, when the member number T is not 0, or when there are members having the same initial value, the third segment is generated (Step 210). Here, the array of structure is arranged in the third segment of the array of structure having a prescribed initial value which secures the RAM area and arranges the initial values in the ROM. Arrangement in the ROM at the time will be described afterward with reference to the segment data form shown in FIG. 4.

Figure 9:
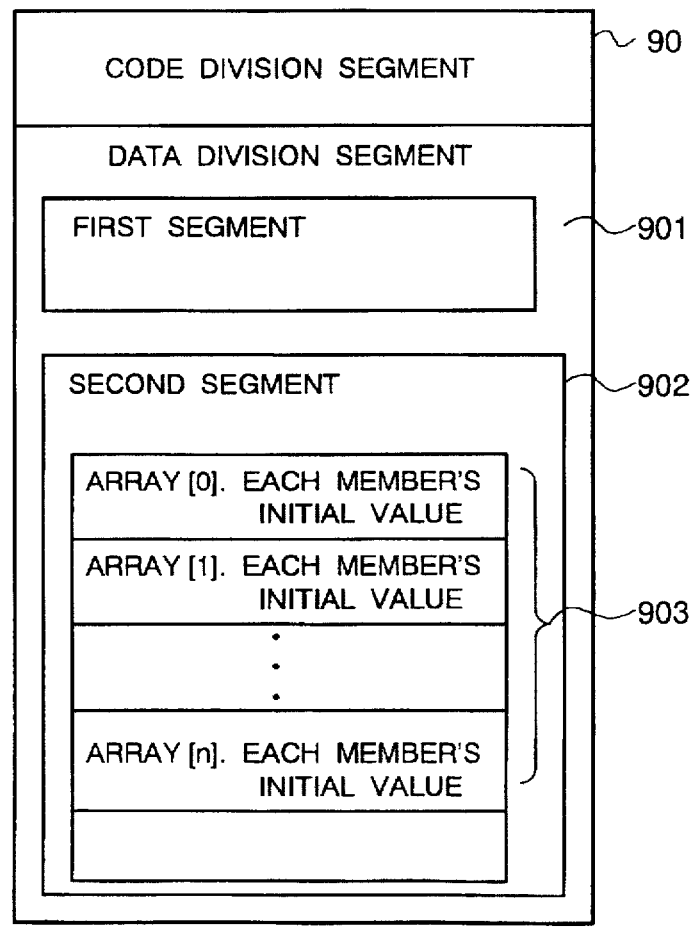
FIG. 9 shows an example of the configuration of an executable program in a segment data form generated by a conventional compiling method.
Figure 11:
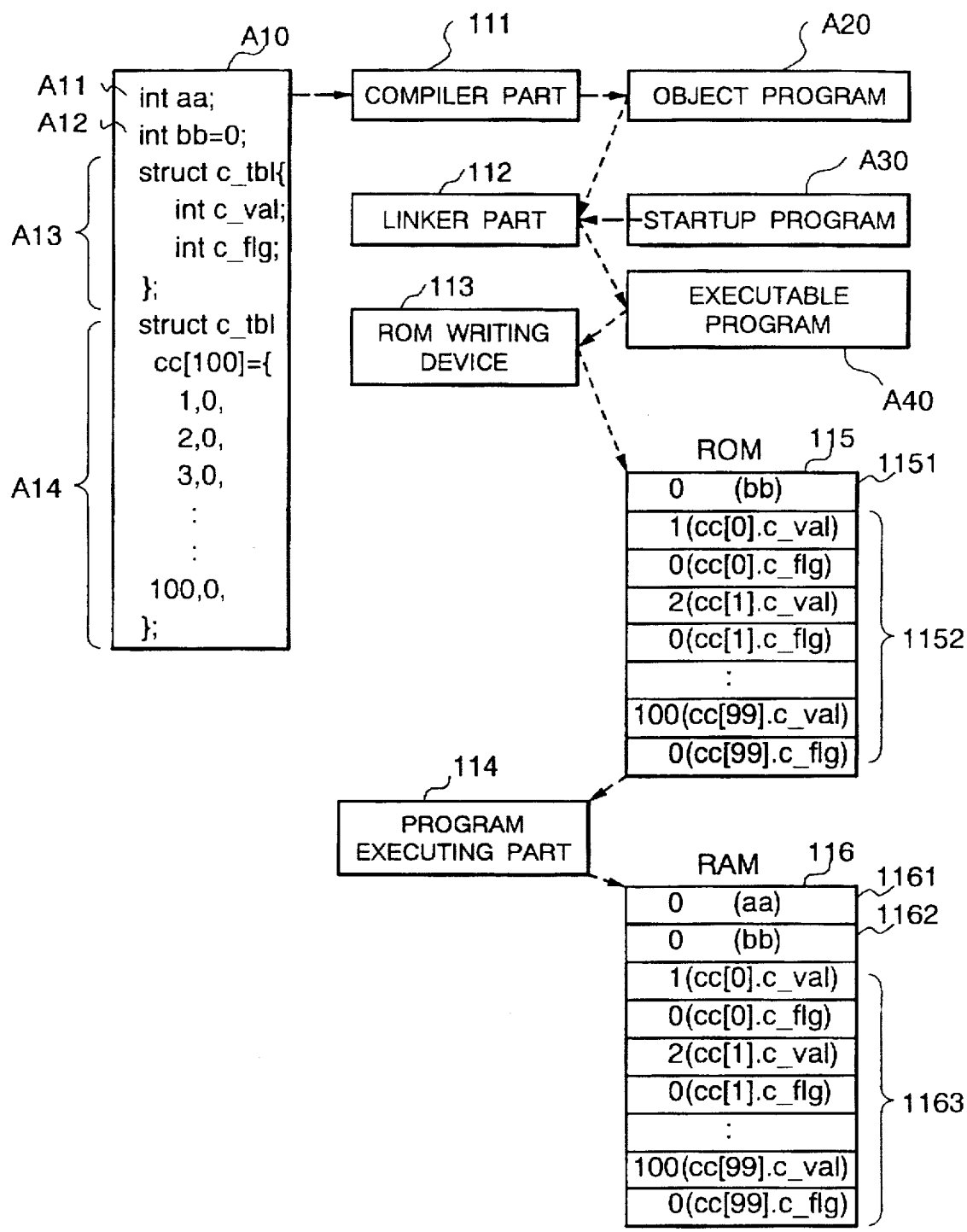
FIG. 11 is a specific example of generating a program by a conventional compiling method.

In Step 209, when the judged result is "0", or when there is no member having the same initial value, the second segment is generated (Step 211). Here, the array of structure is arranged in the second segment for the variable with initial value, which secures the RAM area and arranges the initial values in the ROM. Arrangement into the ROM at this time is the same as the second segment 902 in the conventional segment data form as shown in FIG. 9. And, when it is judged in Step 202 that the defined variable is not in the array of structure, the second segment is generated (Step 211). When it is judged in Step 201 that there is not an initial value, the first segment is generated (Step 212). Here, the variable is arranged in the first segment without initial value for merely securing the RAM area.

Figure 3:
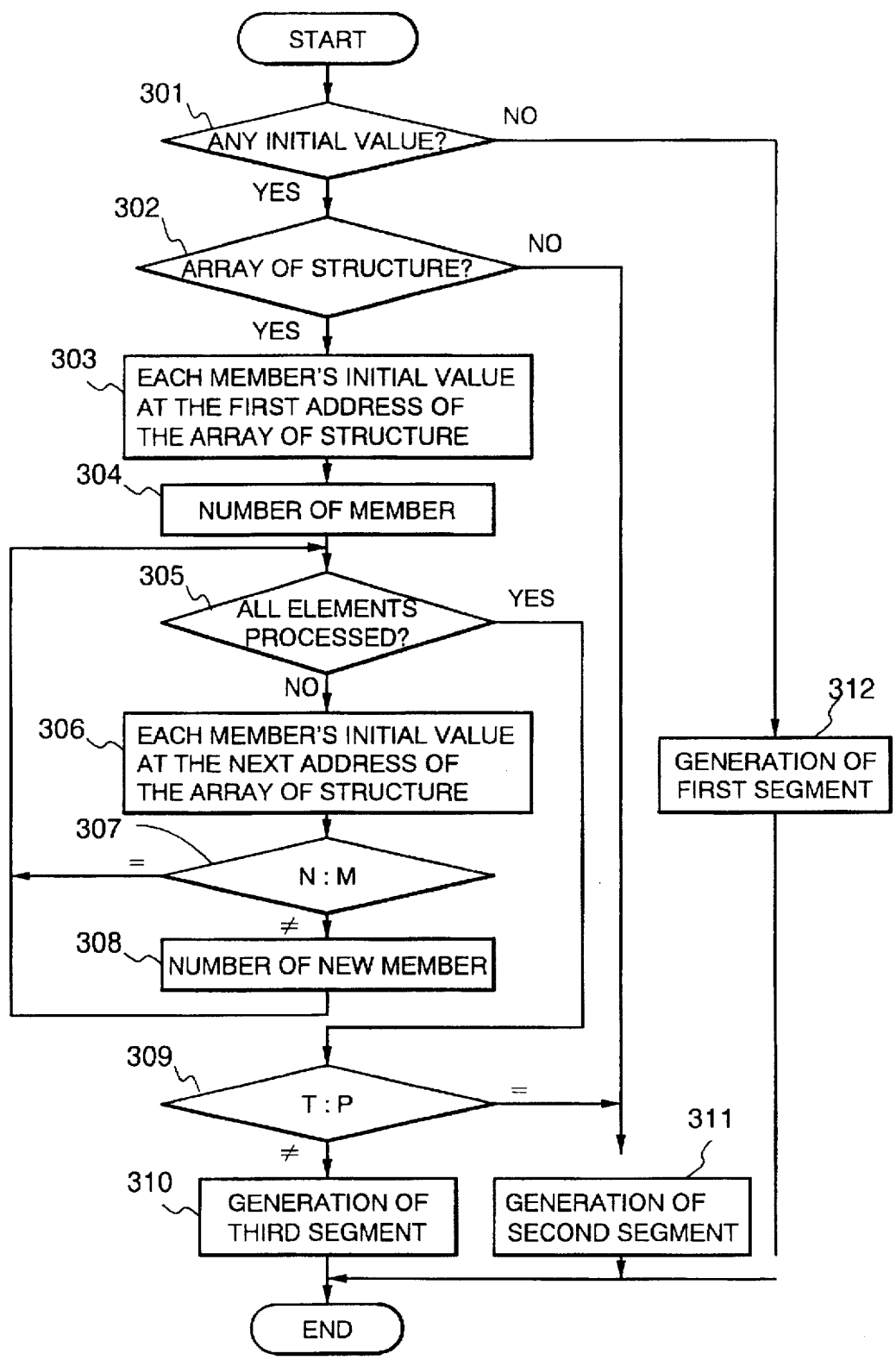
FIG. 3 is a flowchart showing another embodiment of the initial value analysis by the compiling method of the invention.

FIG. 3 is a flowchart showing another embodiment of the procedure for the initial value analysis by the initial value analyzing part 133.

Operations from Step 301 to Step 304 are the same as those from Step 201 to Step 204 shown in FIG. 2. First, it is judged whether the define statement of the variable described in the source program 121 has an initial value (Step 301). When it is judged that it has an initial value, it is judged whether the defined variable is an array of structure (Step 302). When it is judged that the defined variable is an array of structure, initial value N of each member at the first address of the array of structure and member number T of the structure are stored (Step 303, Step 304).

Step 306 through Step 308 are repeated until all elements of the array of structure are completely processed (Step 305).

First, initial value M of each member at the next address is stored (Step 306), and the initial value M of each member stored is compared with the initial value N of each member stored by Step 303 to judge whether they agree or not (Step 307). When all initial values agree, the process returns to Step 305 to judge whether the address of the processed array of structure to be judged is the last address, or whether all elements have been processed. When there is any initial value of mismatched members, the mismatched members are determined as the members without prescribed initial value, member number P without a prescribed value is stored (Step 308), then it is judged whether all elements have been processed (Step 305).

When it is judged that processing has not been completed to the last element of the array of structure, member number T attained in Step 204 is compared with member number P not having the prescribed value attained in Step 207 to judge whether they agree or not, thereby judging whether there is a member having a prescribed initial value (Step 309). When the member number T and the member number P do not agree, or when there are members having the same initial value, the third segment is generated (Step 301).

When it is judged in Step 309 that the member number T agrees with the member number P, or when there is not any member having the same initial value, the second segment is generated (Step 11). And, when it is judged in Step 302 that the defined variable is not an array of structure, the second segment is generated (Step 311). When it is judged in Step 301 that there is not any initial value, the first segment is generated (Step 312).

Figure 4:
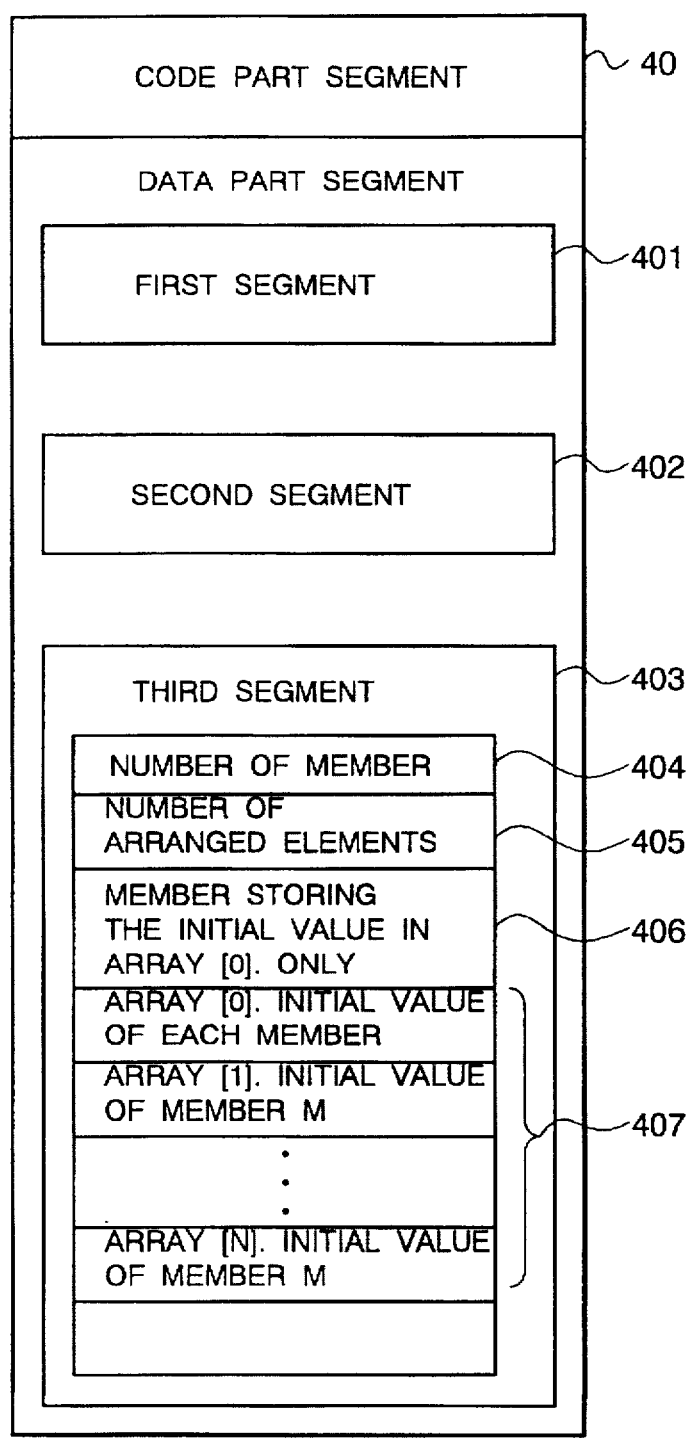
FIG. 4 shows an example of the configuration of a segment data form of the generated executable program.

FIG. 4 shows the configuration of a segment data form of the executable program generated through the above initial value analyzing process.

As shown, the executable program 124 comprises a code part segment and a data part segment. The data part segment has a first segment 401 for a variable without initial value, a second segment 402 for a variable with initial value, and a third segment 403 for an array of structure. The first segment 401 and the second segment 402 are the same as the first segment 901 and the second segment 902 of the executable program generated by the conventional compiling method shown in FIG. 9.

The third segment 403 is a segment of an array of structure where members have a prescribed initial value. As shown, at least three pieces of information; member number 404, arranged element number 405 and member 406 for storing an initial value into array [0] only, are added to initial values 407 of the array of structure. The member number 404 is a member number of a type declared by a structure declare statement struct of the array of structure. The arranged element number 405 is an arranged element number of the array of structure. The member 406 having the initial value stored in the array [0] only indicates the position of a member meeting the conditions that the initial value of a member having the array of structure is one and the same for all elements. This information is handled as bit information because it is applied when there are a plurality of members meeting the conditions. For instance, when only the first member meets the conditions, only bit 0 is determined to be 1 and other bits are 0. When the first member and the third member meet the conditions, bits 0 and 2 are determined to be 1, and other bits are 0.

Figure 6:
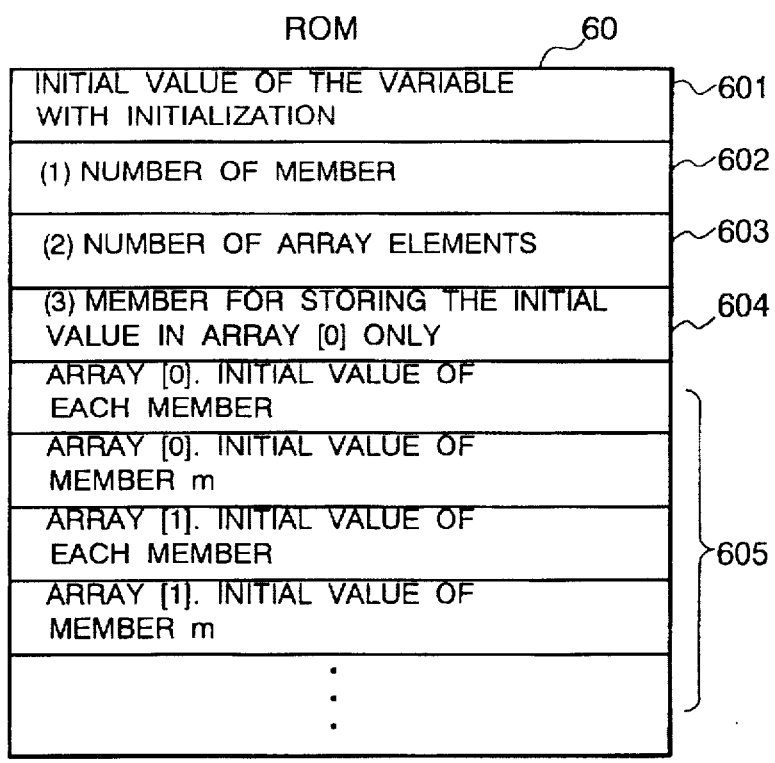
FIG. 6 shows an example of the configuration of data stored in ROM.
Figure 10:
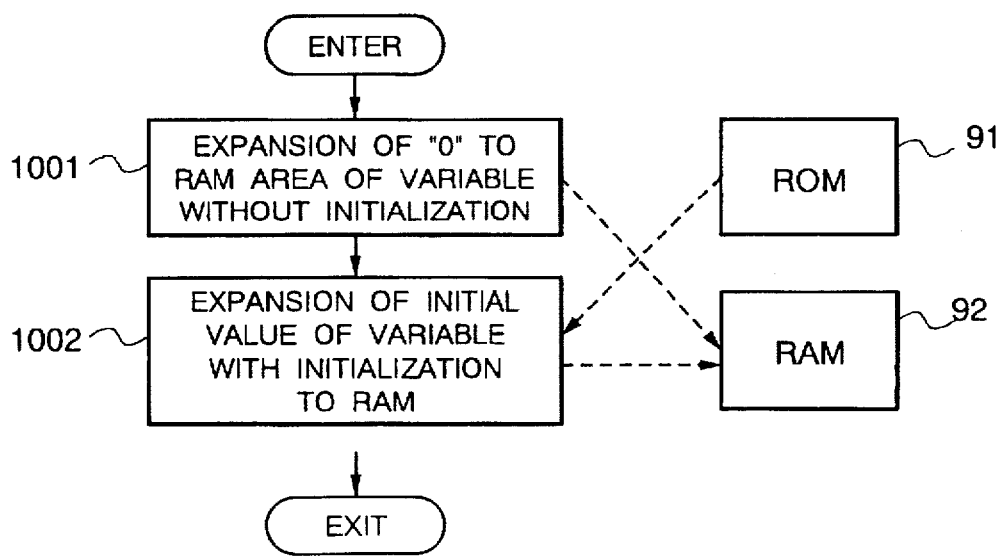
FIG. 10 is a flowchart showing an initial value expanding process by the startup program by a conventional compiling method.

The initial value of the variable with initial value of the second segment 402 generated as described above, the initial values 407 of the array of structure of the third segment 403, and information 404-406 on it are arranged in the ROM as shown in FIG. 6 by a ROM writing device (not shown). For the initial values 407 of the array of structure, the initial value of each member of the array of structure is arranged for every element. But, for a member which meets the conditions of the member 406 storing the initial value in the array [0] only and becomes an object, the initial value is arranged at address 0 of the array, and not arranged at the remaining addresses. Thus, the arrangement of lots of same data in the ROM can be prevented. And, configuration of the third segment 403 as described above allows to restore all initial value data within the RAM from the three additional information by the initial value expanding process by the startup program.

Figure 5:
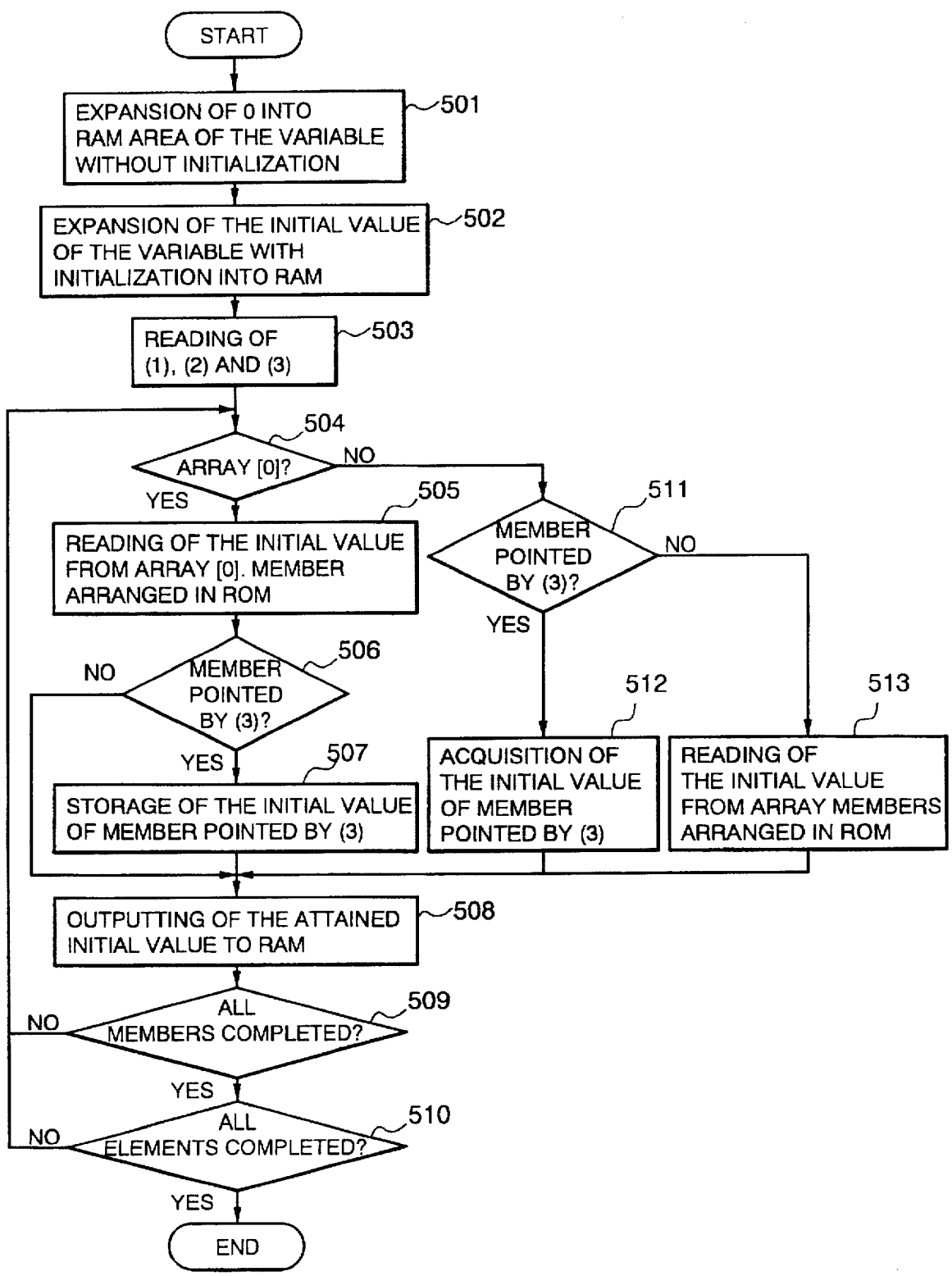
FIG. 5 is a flowchart showing the initial value expanding process by the startup program.

FIG. 5 is a flowchart showing the initial value expanding process by the startup program. FIG. 6 shows the configuration of data stored in ROM by the above-described compiling device.

The initial value expanding process will be described with reference to the flowchart of FIG. 5 and FIG. 6. The following description will be made assuming that the initial value analyzing process was performed according to the procedure shown in FIG. 2. It is to be understood that the same is applied even when the initial value analyzing process was performed according to the procedure shown in FIG. 3.

First, 0 is expanded into the area (see Step 212 in FIG. 2) of the variable without initial value arranged in RAM by the initial value analyzing process (Step 501), an initial value 601 of the variable with initial value is read from ROM 60 and expanded into the area (see Step 211 in FIG. 2) of the variable with initial value (Step 502).

Then, three pieces of additional information; member number 602, arranged element number 603 and member 604 for storing an initial value into array [0] only, are read into the area of the array of structure arranged in the RAM (Step 503), and it is judged whether data of an initial value 605 of the array of structure to be read next is an initial value of address 0 of the array of structure (Step 504). When it is judged that the above data is the initial value at address 0, the initial value 605 of one member at address 0 of the array of structure is read (Step 505).

It is then judged whether the member of the read initial value is present in the member 604 storing the initial value in the array [0] only (Step 506), and if judged it is, the initial value of the read member is stored (Step 507), RAM output process of the next initial value is made, and the read member's initial value is written into an area of the array of structure of the RAM (Step 508). When the member of the read initial value is not present in the member 604 for storing the initial value into the array [0] only, the procedure progresses to the RAM output process of the initial value as it is (Step 506, Step 508).

It is judged whether the initial value expanding of all members of one element of the array of structure has completed (Step 509), and if not completed, the process returns to Step 504, and the initial value of the next member is expanded. And, the procedure is repeated until the initial values of all members of one element are completely expanded. When the initial values of all members of one element are completely expanded, it is judged whether the initial values of all elements of the array of structure have been expanded (Step 510), and if not completed, the process returns to Step 504, and the initial values of the next address are expanded. And, the procedure is repeated until the initial values of all members of the array of structure are expanded. When the initial values of all members of the array of structure are completely expanded, the expanding of the initial value data to the RAM in the initial value expanding process by the startup program is completed.

If the judgment in Step 504 does not result in that the data of the initial value 605 is not an initial value of address 0, it is judged whether a member having an initial value to be read next is present in the member 604 for storing the initial value into the array [0] only (Step 511). If it is present, among the initial values of the members stored in Step 507, the initial value of the corresponding member is read (Step 512), and the procedure goes to the RAM output process of initial values (Step 508). If the member having the initial value to be read next is not present in the member 604 for storing the initial value into the array [0] only, the initial value 605 of the next single member of the array of structure is read (Step 513), then the procedure goes to the RAM output process of initial values (Step 508). Thus, the initial values are arranged in the RAM.

Figure 7:
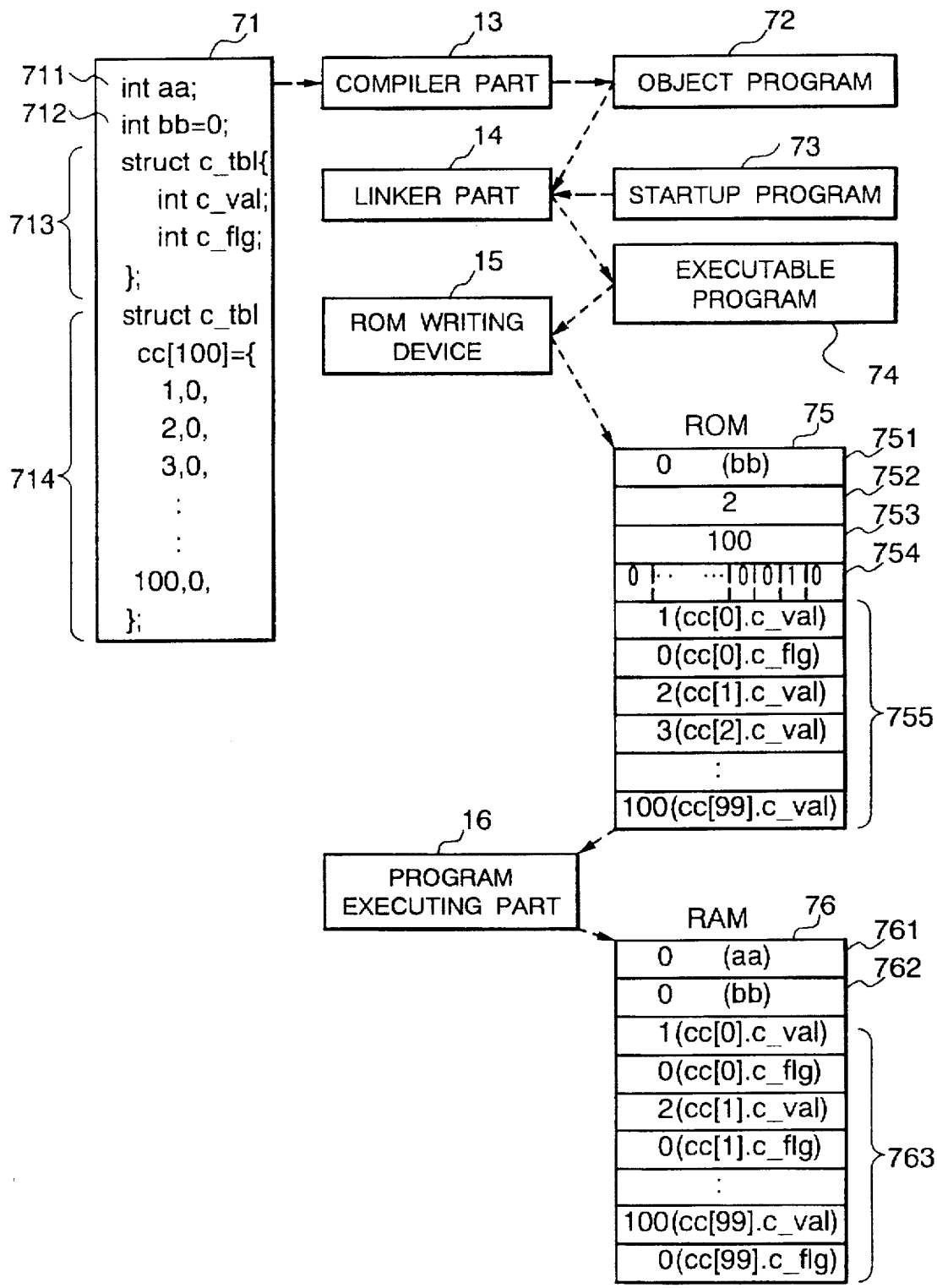
FIG. 7 shows a specific example of generating a program.
Figure 8:
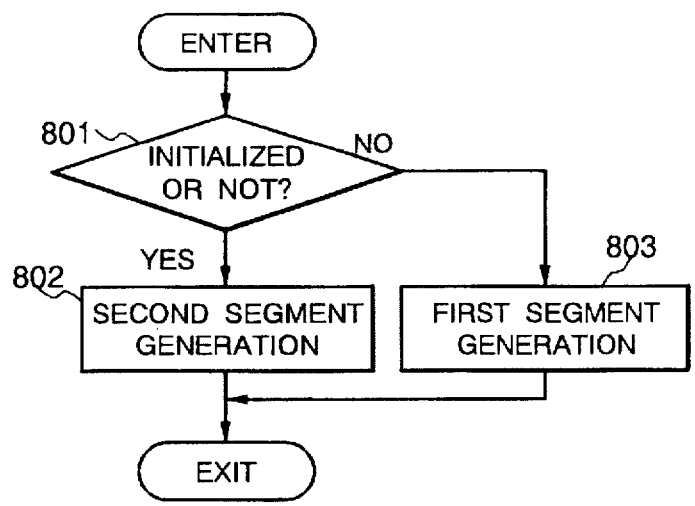
FIG. 8 is a flowchart showing another embodiment of the initial value analysis by a conventional compiling method.

FIG. 7 is a diagram showing a specific example of the arrangement of initial values set in RAM by executing a program in view of the arrangement of initial values in ROM generated in this embodiment.

In FIG. 7, a variable "aa" 711 is defined as the variable without initial value in a source program 71, and a variable "bb" 712 and a variable "cc" 714 are defined as the variable with initial value. The variable "cc" 714 is an array of structure of a c-tbl type declared by a structure declare statement struct 713. The designated source program 71 is entered into a compiler part 13, and an object program 72 is outputted. The generated object program 72 and a startup program 73 are entered into a linker part 14, and an executable program 74 is outputted.

In this connection, processing of the variables by the initial value analyzing means in the compiler part 3 will be described with reference to the flowchart of FIG. 2.

In the flowchart of the initial value analyzing process of FIG. 2, Step 201 judges whether the variable has an initial value, and the variable "aa" 711 is judged not having an initial value. In Step 212, the variable "aa" 711 is arranged in a first segment for no initial value which merely secures an area in the RAM. Then, Step 201 judges that the variable "bb" 712 has an initial value. Step 202 then judges that the variable "bb" 712 is not an array of structure. And, Step 211 arranges the variable "bb" 712 in a second segment for the presence of initial value which secures an area in RAM and arranges the initial value in ROM.

Steps 201 and 202 judge that the variable "cc" 714 is an initial value, a variable and an array of structure. And, Step 203 stores the initial value "1" of member c-val of "cc[0]" and the initial value "0" of member c-flg of "cc[0]", and Step 204 stores the member number "2" of the structure.

Then, Step 205 stores the initial value "2" of member c-val of the next address "cc[1]" and the initial value "0" of member c-flg of "cc[1]", and Step 206 compares the stored initial values. In this case, the initial value of member c-val of "cc[0]" stored in Step 203 is "1" and the initial value of member c-val of "cc[1]" stored in Step 205 is "2", thus both initial values do not agree. In Step 207, a value "1" obtained by subtracting "1", a member number not having a fixed value, from the member number "2" attained in Step 204 is stored as a new member number. Then, Step 208 judges whether all elements of the array of structure have been processed completely. Since the process has not been completed to the element at the last address of the array of structure, the procedure returns to Step 205.

Since there are 100 elements for the variable "cc" 714 of the source program 71, the above process is repeated until it is judged that the element at address 100 has been processed completely. After completing the processing of all elements of the array of structure, Step 209 judges whether the member number not having a fixed value attained in Step 207 is 0 or not. In this case, since the member number not having a fixed value is "1", Step 210 generates a third segment. Thus, the array of structure is arranged in the third segment of the array of structure having a fixed initial value, which secures an area in RAM and arranges the initial values into ROM.

Thus, the initial value analyzing process is completed. The above initial value analyzing process has been described based on the operation shown in the flowchart of FIG. 2, but it is to be understood that the same process can be made by the operation shown in the flowchart of FIG. 3.

With respect to the object program 72 of FIG. 7, the initial value of the variable "bb" 712 and the initial value of the variable "cc" 714 are outputted as data to be arranged into ROM 75, the object program 72 and the startup program 73 are linked by the linker part 14, and the executable program 74 are outputted. The executable program 74 is written in the ROM 75 by a ROM writing device 15. Specifically, the initial value of the variable "bb" 712 is written into a ROM area 751, the member number 2, additional information of the variable "cc" 714, into a ROM area 752, an array element number 100 into a ROM area 753, a value "1" set in a bit representing a member for storing the initial value in an array [0] only into a ROM area 754, and the initial value of the variable "cc" 714 into a ROM area 755, respectively. At this time, the initial value of member c-flg of "cc[1]" or later is not written into the ROM area 755. The initial value written into the ROM 75 is expanded into RAM 76 according to the startup program 73 upon starting the execution by a program executing part 16.

In this connection, processing of the initial value to be expanded will be described with reference to the flowchart of FIG. 5.

In the flowchart of the initial value expanding process of FIG. 5, Step 501 expands "0" into a RAM area 761 for the variable "aa" 711. Then, Step 502 expands the initial value arranged in the ROM area 751 into a RAM area 762 for the variable "bb" 712. And, Step 503 and later processes expand the initial values of the array of structure having a prescribed initial value.

First, in Step 503, the member number of the variable "cc" 714 is read from the ROM area 752, the array element number is read from the ROM area 753, and the member for storing the initial value into the array [0] only is read from the ROM area 754. Then, Step 504 judges whether data of the initial value of the array of structure set in the ROM area 755 and to be read next is the initial value of address 0 of the array of structure. Since it is judged to be the initial value of address 0, the initial value of c-val of "cc[0]" is read from the ROM area 755 in Step 505. And, Step 506 judges whether the member of the initial value read in Step 505 is present in the members storing the initial value into the array [0] only set in the ROM area 754. Since the value of bit 0 is "0", the member c-val is not judged to be a member storing the initial value into the array [0] only, and the initial value of the member c-val of "cc[0]" read is written into the member c-val of "cc[0]" of a RAM area 763 in Step 508.

Then, Step 509 judges whether the initial values of all members of a single element of the array of structure have been expanded completely. Since it is judged that not all values have been expanded, the process returns to Step 504, and the initial value of the next member c-flg of "cc[0]" is expanded.

First, Step 504 judges whether data of the initial value of the array of structure set in the ROM area 755 and to be read next is the initial value of address 0 of the array of structure. Since it is judged to be the initial value of address 0, the initial value of the member c-flg of "cc[0]" is read from the ROM area 755 in Step 505. Then, Step 506 judges whether the member of the initial value read in Step 505 is present in the members storing the initial value into the array [0] only set in the ROM area 754. Since the value of bit 1 is "1", the member c-flg is judged to be a member storing the initial value into the array [0] only, and the initial value "0" of the read member c-flg is stored in Step 507. And, in Step 508, the initial value of the member c-flg of the read "cc[0]" is written into c-flg of "cc[0]" of the RAM area 763.

Then, Step 509 judges whether the initial values of all members of a single element of the array of structure have been expanded completely. Since it is judged that all values have been expanded, the process goes to Step 510, where it is judged whether all elements of the array of structure have been processed completely. Since not all elements have been processed, the process returns to Step 504, where the initial value of the element of the next address is expanded.

First, Step 504 judges whether data of the initial value of the array of structure set in the ROM area 755 and to be read next is the initial value of address 0 of the array of structure. Since it is not judged to be the initial value of address 0, Step 511 judges whether the member of the initial value to be read next is present in the members storing the initial value into the array [0] only set in the ROM area 754. Since the value of bit 0 is "0", the member c-val is not judged to be a member storing the initial value into the array [0] only, and the initial value of the member c-val of "cc[1]" is read from the ROM area 755 in Step 513. Then, in Step 508, the read initial value is written into the member c-val of "cc[1]" of the RAM area 763.

In the same way, the process returns again to Step 111 through Step 509 and Step 504.

Step 511 judges whether the member of the initial value to be read next is present in the members storing the initial value into the array [0] only set in the ROM area 754. Since the value of bit 1 is "0", the member c-flg is judged to be a member storing the initial value into the array [0] only, and the initial value 0 stored in Step 507 is read in Step 512.

Then, in Step 508, the read initial value is written into the member c-flg of "cc[1]" of the RAM 76. And, the process goes to Step 509 and Step 510. The above process is repeated until all elements of the array of structure are completed, and the initial value expanding process is terminated when all elements have been processed.

Through the above initial value analyzing and initial value expanding processes, the initial value 0 of the variable "aa" 711 which is a variable without initial value is expanded into the RAM area 761 without arranging in ROM in the same way as prior art, so that the available areas of the ROM 75 can be reduced. Furthermore, for the array of structure of all members having the same initial value such as the variable "cc" 714, the arrangement of the same data in the ROM can be omitted. In the above case, the ROM areas used for the arrangement of the initial value of the variable "cc" 714 are 104, while the prior art shown in FIG. 8 to FIG. 11 needs 200 areas. Thus, the ROM areas for arranging data can be reduced to a large extent, providing the effects of increasing data quantity used and reducing the used areas of a memory.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A compiling method comprising:
    a step of generating an object program by entering a source program; and
    a step of generating an executable program by entering the generated object program and a startup program for controlling the initial operation of the program at the start of execution;
    said step for generating the object program including:
        a step of performing lexical analysis with respect to the entered source program,
        a step of performing syntax analysis of the program undergone said lexical analysis.
        a step of performing analysis of the initial value of variables described in the program undergone the syntax analysis, and
        a step of generating a code according to the result of the analysis of the initial value and outputting the object program; and
    said step of analyzing the initial value including:
        a step of dividing the variables into those without an initial value and those with an initial value according to a define statement of variables described in said source program, and further dividing the variables with an initial value into those of an array of structure and other variables,
        a step of judging with respect to the variables recognized as the array of structure among the divided variables whether prescribed members of elements configuring said array of structure have one and the same initial value, and
        a step of arranging said divided variables into different segments, and arranging the variables of the array of structure where said prescribed members have the same initial value into said segments with said same initial values omitted.

2. A compiling method as set forth in claim 1, wherein the step of arranging the variables into the segments, with respect to the variables of the array of structure where said prescribed members have the same initial value, arranges at least a member number of said array of structure, an arranged element number of said array of structure, information specifying members having the same initial value, the initial value of the members having the same initial value, and different initial values of the members into the segments.

3. A compiling method as set forth in claim 1, wherein the step of judging whether the prescribed members of said array of structure have one and the same initial value subtracts the number of the members having different initial values from the number of all members with respect to each element of said array of structure, and judges that said array of structure has the members having the same initial value if the obtained value is not zero.

4. A compiling method as set forth in claim 3, wherein the step of judging whether all members of said array of structure have one and the same initial value includes:

a step of storing the initial value of each member at the first address of said array of structure, a step of storing the number of members of said array of structure, a step of comparing the initial value of each member at the second address and later of said array of structure with the initial value N of each member of said first address, and if they do not agree, subtracting the number of the members which have the different initial values from the number of the stored members and storing as a new member number, and a step of judging that said array of structure has members having the same initial value when the stored new member number is not zero, and judging that said array of structure does not have members having the same initial value when said member number is zero.

5. A compiling method as set forth in claim 3, wherein the step of arranging the variables into the segments, with respect to the variables of the array of structure where said prescribed members have the same initial value, arranges at least a member number of said array of structure, an arranged element number of said array of structure, information specifying members having the same initial value, the initial value of the members having the same initial value, and different initial values of the members into the segments.

6. A compiling method as set forth in claim 1, wherein the step of judging whether the prescribed members of said array of structure have one and the same initial value compares the number of members having different initial values for each element of said array of structure with said number of all members, and when said two member numbers are different, judges that said array of structure has members having the same initial value.

7. A compiling method as set forth in claim 6, wherein the step of judging whether all members of said array of structure have one and the same initial value includes:

a step of storing the initial value of each member at the first address of said array of structure, a step of storing the number of members of said array of structure, a step of comparing the initial value of each member at the second address and later of said array of structure with the initial value of each member of said first address, and if they do not agree, storing the number of members not having the agreed initial value, and a step of comparing the number of said stored all members and the number of members not having the agreed initial value, and when said two member numbers are not same, judging that said array of structure has members having the same initial value, and when said two member numbers are same, judging that said array of structure does not have members having the same initial value.

8. A compiling method as set forth in claim 6, wherein the step of arranging the variables into the segments, with respect to the variables of the array of structure where said prescribed members have the same initial value, arranges at least a member number of said array of structure, an arranged element number of said array of structure, information specifying members having the same initial value, the initial value of the members having the same initial value, and different initial values of the members into the segments.

9. A compiling device comprising:

a compiler means which receives a source program and generates an object program, and a linker means which receives the generated object program and a startup program for controlling the initial operation at the start of executing the program and outputs an executable program, said compiler means includes:

a lexical analyzing means for performing lexical analysis with respect to the entered source program, a syntax analyzing means for performing syntax analysis of the program undergone said lexical analysis, an initial value analyzing means for analyzing the initial values of variables described in the program undergone the syntax analysis, and a code generating means for generating a code according to the result of the analysis of the initial value and outputting the object program; and said initial value analyzing means divides the variables into those without an initial value and those with an initial value according to a define statement of variables described in said source program, and further divides the variables with an initial value into those of an array of structure and other variables, judges with respect to the variables recognized as the array of structure among the divided variables whether prescribed members of elements configuring said array of structure have one and the same initial value, and arranges said divided variables into different segments, and arranges the variables of the array of structure where said prescribed members have the same initial value into said segments with said same initial values omitted.

10. A compiling device as set forth in claim 9, wherein said initial value analyzing means, with respect to the variables of the array of structure where said prescribed members have the same initial value, arranges at least a member number of said array of structure, an arranged element number of said array of structure, information specifying members having the same initial value, the initial value of the members having the same initial value, and different initial values of the members into the segments.

11. A compiling device as set forth in claim 10, wherein the startup program to be linked with the object program by said linker means, at the start of executing the program, refers to information specifying a member having said same initial value and the initial value of the member having the same initial value, with respect to the array of structure arranged in the segment with the same initial value omitted, to control an initial value expanding process for supplementing said omitted initial value.

12. A compiling device as set forth in claim 9, wherein the initial value analyzing means subtracts the number of the members having different initial values from the number of all members with respect to each element of said array of structure, and judges that said array of structure has the members having the same initial value if the obtained value is not zero, and with respect to the variables of the array of structure where said prescribed members have the same initial value, arranges at least a member number of said array of structure, an arranged element number of said array of structure, information specifying members having the same initial value, the initial value of the members having the same initial value, and different initial values of the members into the segments.

13. A compiling device as set forth in claim 12, wherein the startup program to be linked with the object program by said linker means, at the start of executing the program, refers to information specifying a member having said same initial value and the initial value of the member having the same initial value, with respect to the array of structure arranged in the segment with the same initial value omitted, to control an initial value expanding process for supplementing said omitted initial value.

14. A compiling device as set forth in claim 9, wherein the initial value analyzing means compares the number of members having different initial values for each element of said array of structure with said number of all members, and when said two member numbers are different, judges that said array of structure has members having the same initial value, and with respect to the variables of the array of structure where said prescribed members have the same initial value, arranges at least a member number of said array of structure, an arranged element number of said array of structure, information specifying members having the same initial value, the initial value of the members having the same initial value, and different initial values of the members into the segments.

15. A compiler device as set forth in claim 14, wherein the startup program to be linked with the object program by said linker means, at the start of executing the program, refers to information specifying a member having said same initial value and the initial value of the member having the same initial value, with respect to the array of structure arranged in the segment with the same initial value omitted, to control an initial value expanding process for supplementing said omitted initial value.

\* \* \* \* \*